United States Patent
Sidorovich Paradiso et al.

(10) Patent No.: US 11,794,914 B2
(45) Date of Patent: Oct. 24, 2023

(54) EMERGENCY POWER UNIT FOR ELECTRIC AIRCRAFT

(71) Applicant: PRATT & WHITNEY CANADA CORP., Longueuil (CA)

(72) Inventors: Ivan Sidorovich Paradiso, Toronto (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 155 days.

(21) Appl. No.: 17/379,285

(22) Filed: Jul. 19, 2021

(65) Prior Publication Data
US 2023/0013543 A1    Jan. 19, 2023

(51) Int. Cl.
*B64D 27/24* (2006.01)
*B64D 27/02* (2006.01)
(Continued)

(52) U.S. Cl.
CPC .......... *B64D 27/24* (2013.01); *B64D 27/023* (2013.01); *B60L 2200/10* (2013.01);
(Continued)

(58) Field of Classification Search
CPC ................. B64D 27/24; B64D 27/023; B64D 2027/026; B64D 2041/002; B64D 2221/00; B60L 2200/10; F01D 13/02; F01D 15/10; F02C 3/30; F05D 2220/50; F05D 2220/76; F05D 2270/09; H02J 2310/44; F02K 9/00; F02K 5/00
See application file for complete search history.

(56) References Cited

U.S. PATENT DOCUMENTS 3,717,419 A * 2/1973 Olcott ................... C04B 35/522
                                                       416/241 A
6,457,306 B1 10/2002 Abel et al.
(Continued)

FOREIGN PATENT DOCUMENTS

EP    3461742 A1    4/2019
FR    3104333 A1    6/2021

OTHER PUBLICATIONS

Wikipedia, Rocket Engine, https://https://en.wikipedia.org/wiki/Rocket_engine, accessed on Jul. 5, 2021.
(Continued)

*Primary Examiner* — Gerald L Sung
*Assistant Examiner* — Rene D Ford
(74) *Attorney, Agent, or Firm* — Norton Rose Fulbright Canada LLP

(57) ABSTRACT

Electric aircraft power plants and associated methods are provided. One power plant includes an emergency power unit (EPU) for providing electric power in the event of a malfunction of a battery pack of an electric aircraft to permit the electric aircraft to make an emergency maneuver. The EPU includes a rocket engine for generating a stream of exhaust fluid using a rocket propellant, a turbine operatively connected to extract energy from the stream of exhaust fluid generated by the rocket engine, and an electric generator operatively connected to be driven by the turbine and to supply electric power to an electric motor propelling the electric aircraft.

16 Claims, 6 Drawing Sheets

(51) Int. Cl.
  *B64D 41/00* (2006.01)
  *F01D 13/02* (2006.01)
  *F01D 15/10* (2006.01)
  *F02C 3/30* (2006.01)

(52) U.S. Cl.
  CPC .. *B64D 2027/026* (2013.01); *B64D 2041/002* (2013.01); *B64D 2221/00* (2013.01); *F01D 13/02* (2013.01); *F01D 15/10* (2013.01); *F02C 3/30* (2013.01); *F05D 2220/50* (2013.01); *F05D 2220/76* (2013.01); *F05D 2270/09* (2013.01); *H02J 2310/44* (2020.01)

(56) References Cited

U.S. PATENT DOCUMENTS

| | | |
|---|---|---|
| 9,388,090 B2 | 7/2016 | Joshi et al. |
| 9,951,694 B2 | 4/2018 | Thiriet et al. |
| 2006/0042262 A1 | 3/2006 | Ganev et al. |
| 2008/0115358 A1* | 5/2008 | Rice ............... F04D 29/284 419/49 |
| 2012/0269633 A1 | 10/2012 | Danforth et al. |
| 2016/0176534 A1* | 6/2016 | Himmelmann ...... B60L 50/15 290/45 |
| 2017/0114723 A1 | 4/2017 | Marconi et al. |
| 2019/0100322 A1* | 4/2019 | Schank ............... B64C 27/28 |
| 2019/0316469 A1* | 10/2019 | Spadacini ............. F01D 9/04 |
| 2022/0185489 A1* | 6/2022 | Thiriet ............... B64D 27/02 |

OTHER PUBLICATIONS

Wikipedia, Ljungström turbine, https://https://en.wikipedia.org/wiki/Ljungström_turbine, accessed on Jul. 5, 2021.
European Patent Office, Communication re. extended European search report for European patent application No. 22185842.6, dated Dec. 15, 2022.

* cited by examiner

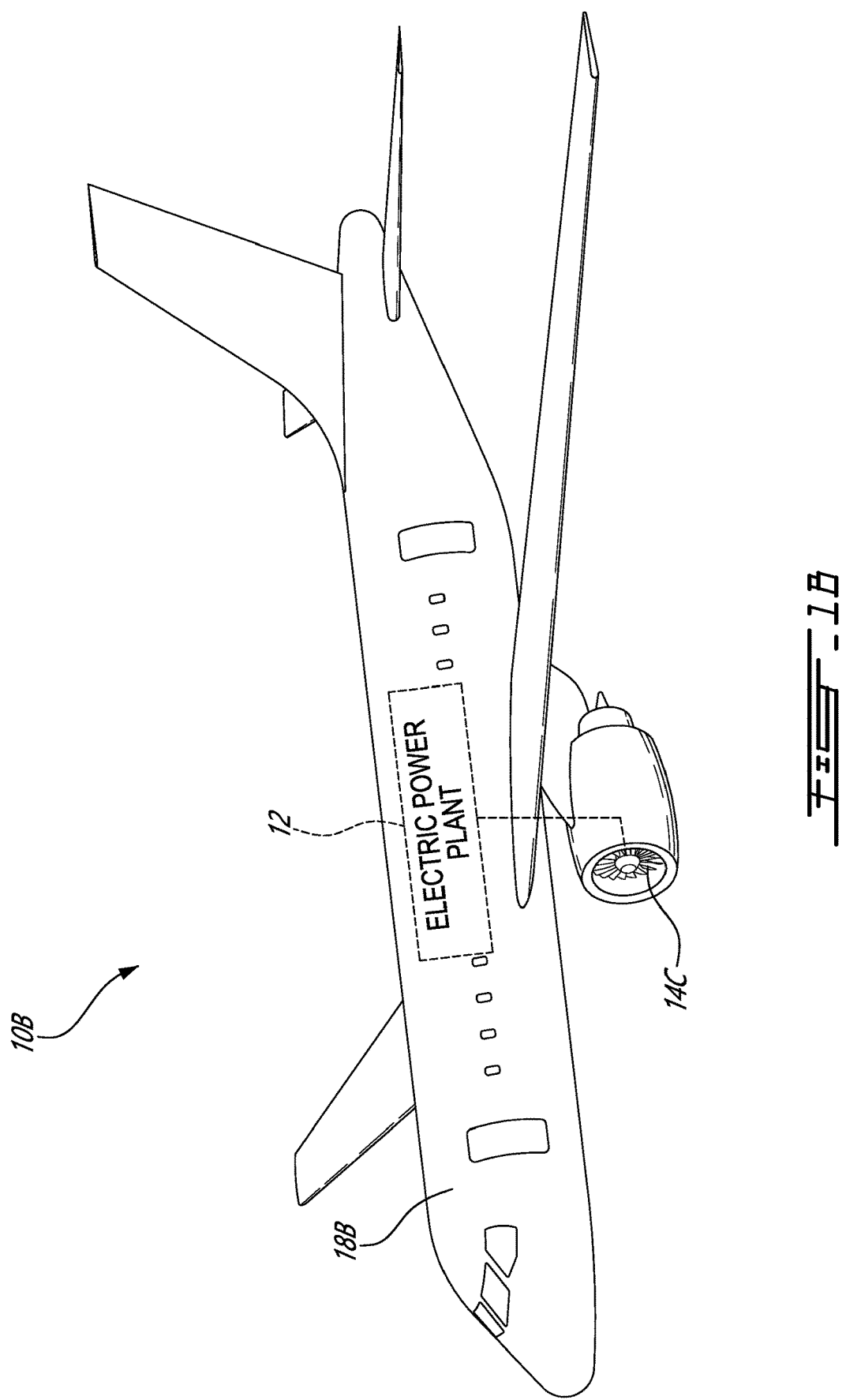

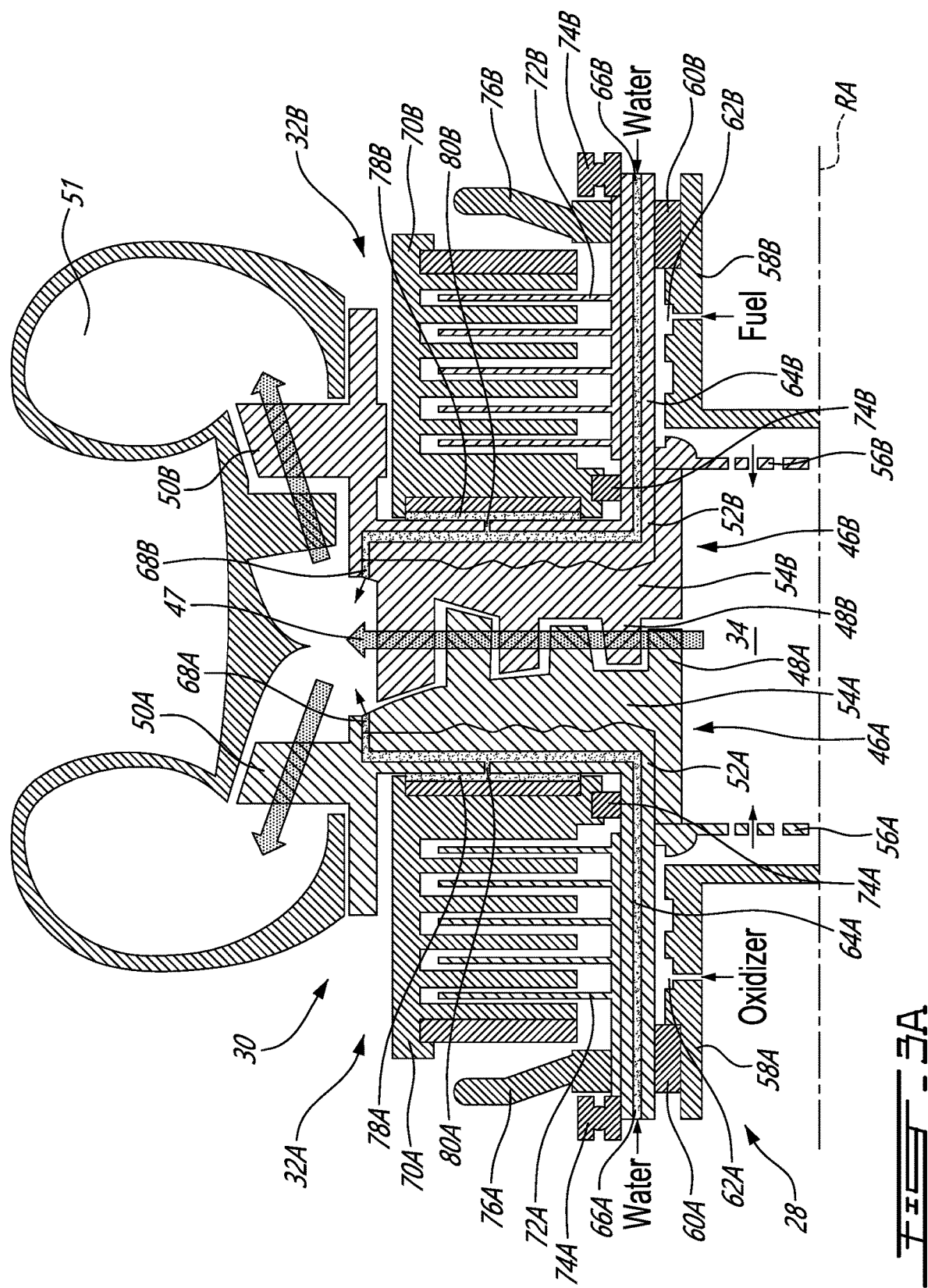

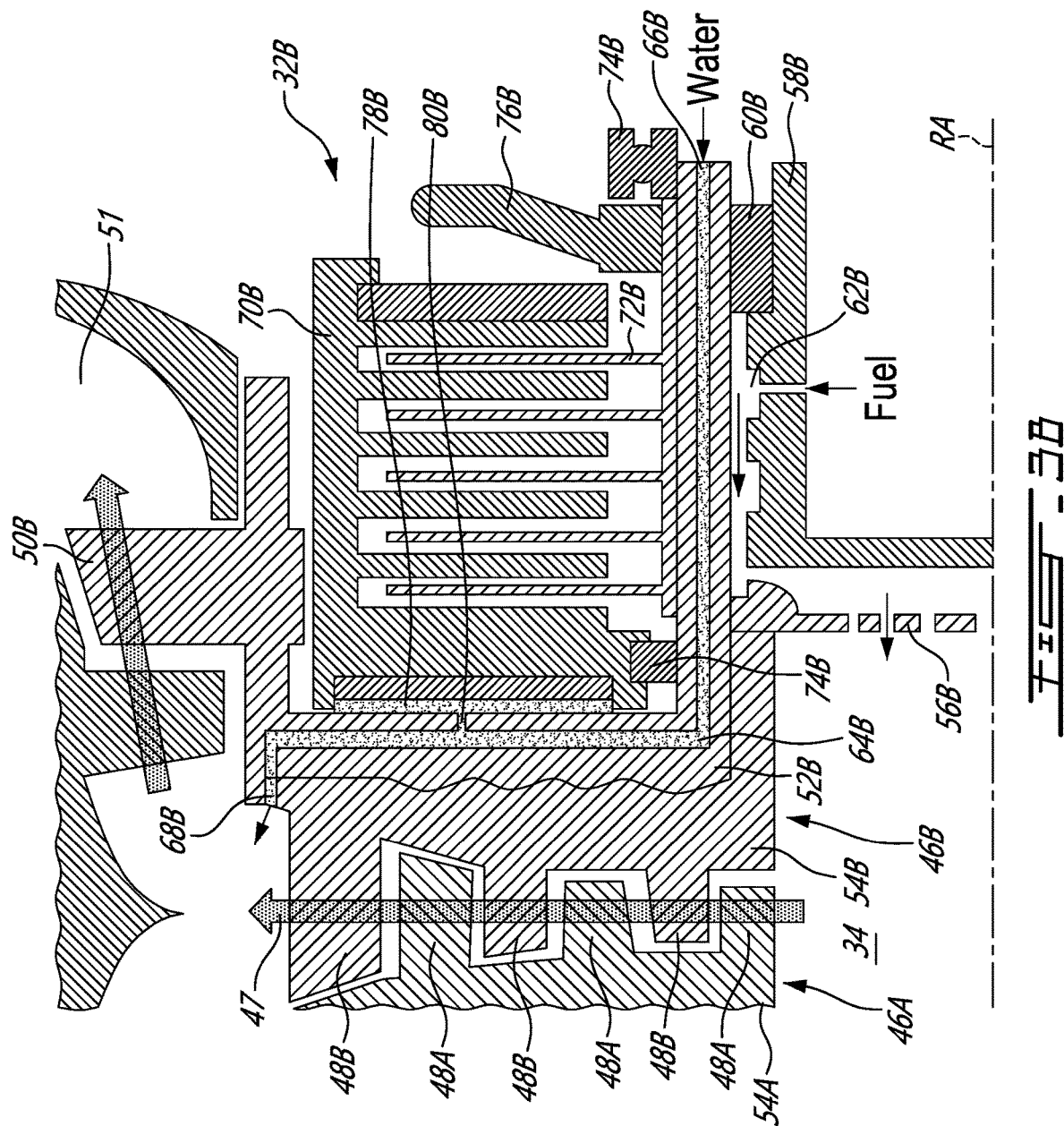

EMERGENCY POWER UNIT FOR ELECTRIC AIRCRAFT

TECHNICAL FIELD

The disclosure relates generally to electric aircraft, and more particularly to operating electric aircraft.

BACKGROUND

The use of electric vertical take-off and landing (eVOTL) aircraft may be beneficial for urban air mobility (air taxi) especially in urban areas with ground traffic congestion. In an air taxi scenario, the eVTOL aircraft would carry one or more passengers and fly over populated areas. It is therefore important that the operation of the eVTOL be safe and reliable. For example, in the event of a malfunction of the eVTOL, it is desirable that the eVTOL still be able to land in a safe and controlled manner.

SUMMARY

In one aspect, the disclosure describes an electric aircraft power plant comprising:
an electric motor for propelling an electric aircraft;
a source of electric power operatively connected to drive the electric motor;
a first tank storing a first propellant;
a second tank storing a second propellant;
a gas generator operatively connectable to the first and second tanks to receive the first and second propellants, and generate a stream of exhaust gas from a reaction of the first and second propellants;
a turbine operatively connected to the gas generator to extract energy from the stream of exhaust gas generated by the gas generator; and
an electric generator operatively connected to be driven by the turbine and to supply electric power to the electric motor.

In another aspect, the disclosure describes an emergency power unit for an electrically-propelled aircraft. The emergency power unit comprises:
a rocket engine for generating a stream of exhaust fluid using a rocket propellant;
a turbine operatively connected to extract energy from the stream of exhaust fluid generated by the rocket engine; and
an electric generator operatively connected to be driven by the turbine and to supply electric power to the electric motor.

In a further aspect, the disclosure describes a method of operating an electrically-propelled aircraft. The method comprises:
supplying first electric power from a source of electric power to an electric motor propelling the aircraft;
detecting an abnormal condition associated with the source of electric power;
after detecting the abnormal condition:
activating a rocket engine to generate a stream of exhaust fluid from the rocket engine;
driving a turbine using the exhaust fluid;
driving an electric generator with the turbine to generate second electric power; and
using the second electric power to drive the electric motor propelling the aircraft.

The method may comprise directing water inside a body of the turbine to cool the turbine, and discharging the water from the body of the turbine into the exhaust fluid.

Further details of these and other aspects of the subject matter of this application will be apparent from the detailed description included below and the drawings.

DESCRIPTION OF THE DRAWINGS

Reference is now made to the accompanying drawings, in which:

FIG. 1B is a schematic perspective view of a fixed wing aircraft including the electric power plant as described herein;

FIG. 3A is a schematic axial cross-sectional view of part of the exemplary emergency power unit of the electric power plant of FIG. 2;

FIG. 3B is an enlarged schematic axial cross-sectional view of part of the emergency power unit of FIG. 3A.

DETAILED DESCRIPTION

This disclosure describes electric power plants for electrically-powered aircraft, and associated methods. The power plants and methods described herein may promote a safe operation of electric aircraft. The power plants and methods described herein may be particularly useful for use with electric vertical take-off and landing (eVOTL) aircraft, but may also be used on other types of electric aircraft. In some embodiments, the power plants and methods described herein may, for example, mitigate the effect of a battery pack malfunction, permit an emergency maneuver of the electric aircraft and facilitate a safe and controlled landing of the electric aircraft in the event of such malfunction. In some embodiments, the power plants described herein may include an emergency power unit that is configured to be activated and use a rocket engine to generate electric power for powering the electric aircraft in the event of a battery pack malfunction.

The term "connected" may include both direct connection (in which two elements contact each other) and indirect connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1A:
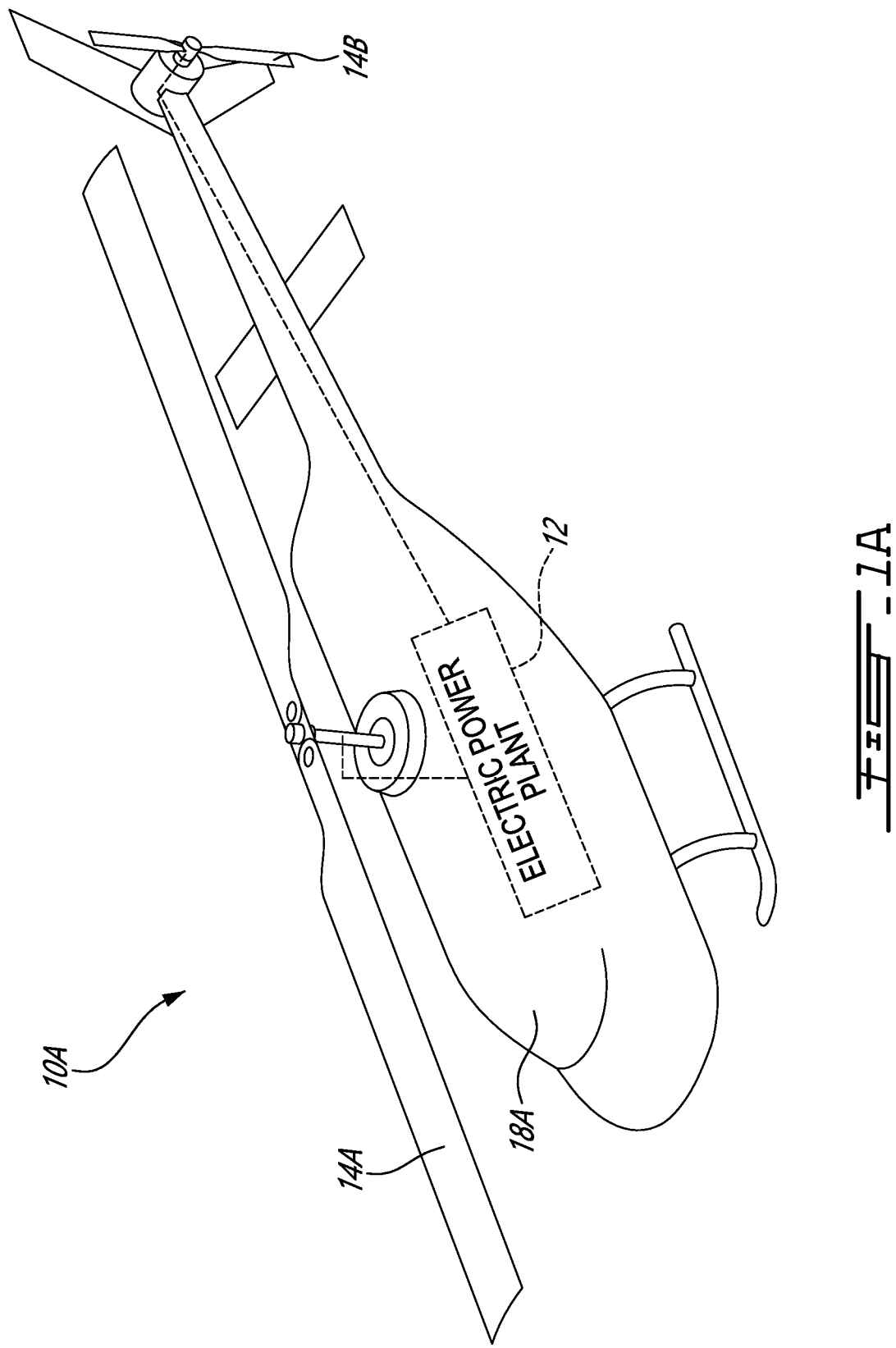
FIG. 1A is a schematic perspective view of an exemplary rotary wing aircraft including an electric power plant as described herein.

FIGS. 1A and 1B are schematic perspective views of exemplary electric aircraft 10A, 10B (referred generically herein as "aircraft 10") including electric power plant 12 as described herein. In reference to FIG. 1A, power plant 12 may be integrated into electric rotary wing aircraft 10A (e.g., helicopter). For example, power plant 12 may be operatively connected to drive main rotor 14A and tail rotor 14B (referred generically herein as "rotor 14") of rotary wing aircraft 10A. Power plant 12 may be used to power any lift- and/or thrust-producing device(s) of rotary wing aircraft 10A. Rotary wing aircraft 10A may be an electric vertical take-off and landing (eVTOL) aircraft that can hover, take off, and land vertically. It is understood that power plant 12 may be used on any suitable type of eVTOL aircraft including rotorcraft. Power plant 12 may be used to drive one or more powered rotor(s) on a rotary wing eVTOL aircraft for example.

Rotary wing aircraft 10A may include fuselage 18 housing a passenger cabin for receiving one or more passengers therein, and/or a cockpit for receiving one or more pilots therein. In some embodiments, rotary wing aircraft 10A may be a passenger aircraft suitable for urban air mobility (air taxi) to provide relatively efficient and clean transportation in populated regions. Alternatively, rotary wing aircraft 10A may be an unmanned aerial vehicle commonly known as a drone without any human pilot, crew or passenger on board. In cases where rotary wing aircraft 10A is a drone, rotary wing aircraft 10A may be operated under remote control by a human operator. In various embodiments, rotary wing aircraft 10A may have various degrees of autonomy from including one or more autopilot systems to being fully autonomous.

In reference to FIG. 1B, power plant 12 may be integrated into electric fixed wing aircraft 10B. For example, power plant 12 may be operatively connected to drive one or more rotors 14C (e.g., fans, propellers) serving to propel fixed wing aircraft 10B. Fixed wing aircraft 10B may be a corporate (e.g., business jet), private, or commercial (e.g., airliner) passenger aircraft. Fixed wing aircraft 10B may include fuselage 18B housing a passenger cabin for receiving one or more passengers therein, and/or a cockpit for receiving one or more pilots therein.

Figure 2:
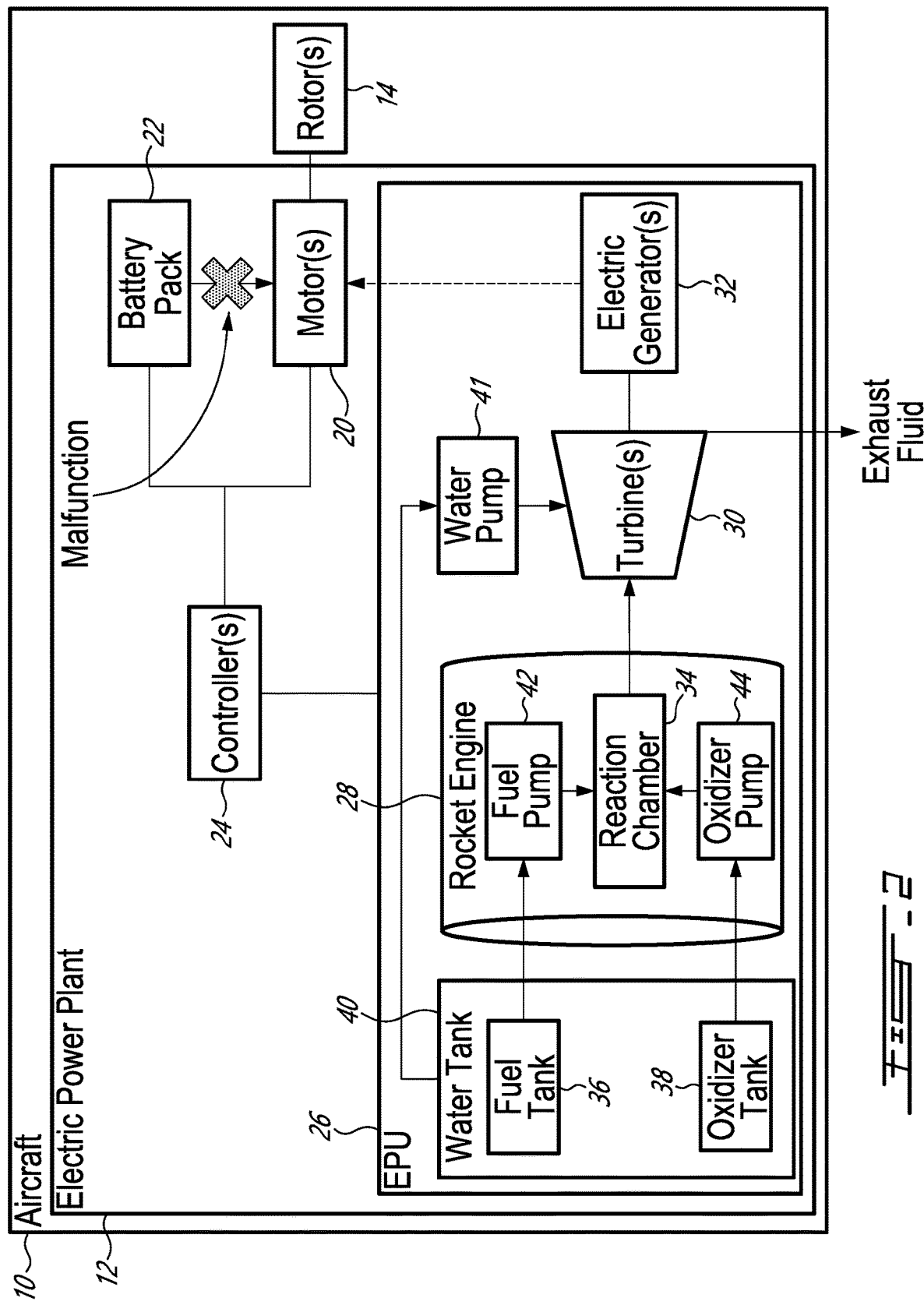
FIG. 2 is a schematic representation of an aircraft including an exemplary electric power plant as described herein.

FIG. 2 is a schematic representation of aircraft 10 including an exemplary electric power plant 12. Power plant 12 may include various components for supplying power for propelling aircraft 10 and/or for supplying power for other non-propulsion functions (e.g., cabin pressurization, environmental control, lighting, etc.) of aircraft 10. For example, power plant 12 may serve to supply power to drive rotor(s) 14 to generate lift and/or thrust of aircraft 10.

During the normal operation of aircraft 10, power plant 12 may rely mainly or entirely on electric power to propel aircraft 10 by driving rotor(s) 14 via one or more electric motors 20 (referred hereinafter in the singular as "motor 20") and optionally also powering other devices of aircraft 10. In various embodiments, motor 20 may be a brushless DC motor, a brushed DC motor, or an AC induction motor for example. During the normal operation of aircraft 10, battery pack 22 (or other energy storage device) may serve as an electric power source for driving motor 20 and propelling aircraft 10. Battery pack 22 may include a plurality of battery cells. In some embodiments, battery pack 22 may include lithium-ion or other suitable type(s) of battery(ies). It is understood that other type(s) of electric power source (e.g., energy storage device) may be used to power motor 20 during normal operation of power plant 12.

The operation of motor 20 and the delivery of electric power from battery pack 22 to motor 20 may be controlled by controller 24 via a suitable power electronics module (PEM) including electronic switches to perform suitable power conversion and provide motor 20 with electric power having the desired voltage, current, waveform, etc. to implement the desired propulsion behaviour and performance of aircraft 10 during operation.

Controller 24 may be configured to control various aspects of operation of aircraft 10 based on pilot input for example. Controller 24 may include one or more data processors and non-transitory machine-readable memory containing instructions executable by controller 24. Controller 24 may include any suitable device(s) configured to cause a series of steps to be performed by controller 24 so as to implement a computer-implemented process such that instructions, when executed by controller 24 or other programmable apparatus, may cause the functions/actions specified in the methods described herein to be executed. Controller 24 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Various aspects of the present disclosure may be embodied as systems, devices, methods and/or computer program products. Accordingly, aspects of the present disclosure may take the form of a hardware embodiment, a software embodiment or an embodiment combining software and hardware aspects. Furthermore, aspects of the present disclosure may take the form of a computer program product embodied in one or more non-transitory computer readable medium(ia) having computer readable program code embodied thereon. Computer program code for carrying out operations for aspects of the present disclosure may be written in any combination of one or more programming languages. Such program code may be executed entirely or in part by controller 24 or other data processing device(s). It is understood that, based on the present disclosure, one skilled in the relevant arts could readily write computer program code for implementing the methods described and illustrated herein.

Power plant 12 may also include emergency power unit (EPU) 26 that may be used to supply electric power to motor 20 in the event of an abnormal condition (e.g., actual or impending malfunction) associated with battery pack 22 for example. The abnormal condition associated with battery pack 22 may include any situation resulting in an inability to continue driving motor 20 using electric power supplied by battery pack 22. The abnormal condition associated with battery pack 22 is illustrated in FIG. 2 as an X indicating an interruption in the delivery of electric power from battery pack 22 to motor 20. For example, the abnormal condition associated with battery pack 22 may include a partial or complete failure of one or more battery cells within battery pack 22. In some embodiments, the abnormal condition associated with battery pack 22 may include an excessive temperature of one or more battery cells of battery pack 22. In some embodiments, the abnormal condition associated with battery pack 22 may include a malfunction of the power electronics module controlling the current flow from battery pack 22 to motor 20.

One or more sensors may be operatively connected to battery pack 22 and to controller 24 to monitor temperature(s), voltage(s), current(s) and/or other operating parameters associated with battery pack 22. Data acquired via such sensors may be used by controller 24 to assess the operating state of battery pack 22 and/or detect the occurrence of the abnormal condition. In some embodiments, controller 24 may be configured to, based on data acquired via such sensors, cause a contactor operatively disposed between battery pack 22 and motor 20 to open to electrically disconnect motor 20 from battery pack 22 in the event of a detected abnormal condition to prevent an impending failure, and/or to prevent a potential escalation associated with the detected abnormal condition.

EPU 26 may be configured to temporarily generate and supply emergency/backup electric power to drive motor 20 in the event of the detected abnormal condition resulting in motor 20 no longer being able to be driven by electric power from battery pack 22. During normal operation of electric power plant 12, EPU 26 may be inactive (dormant) when motor 20 is driven by battery pack 22. In some embodiments, EPU 26 may be only activated in an emergency condition such as when the abnormal condition is detected for example. In various embodiments, the abnormal condition may be detected by controller 24 and controller 24 may then automatically cause the activation of EPU 26 in response to such detection. In some embodiments, the activation of EPU 26 may be initiated substantially immediately upon the detection of the abnormal condition. Alternatively, in some embodiments, the activation of EPU 26 may be initiated manually by a pilot of aircraft 10 via suitable cockpit control (e.g., switch, dial, button) when the abnormal condition is perceived by the pilot.

EPU 26 may be configured to generate electric power to drive motor 20 as a temporary replacement for battery pack 22. The generating capacity and operating duration of EPU 26 may be selected based on the type of aircraft 10 and on the operating parameters (e.g., payload, maximum altitude, maximum distance from landing site(s), cruising speed, etc.) of aircraft 10 to permit aircraft 10 to perform one or more emergency maneuver(s) permitting a safe and controlled landing of aircraft 10. For example, the generating capacity and operating duration of EPU 26 may be selected to be sufficient to permit aircraft 10 to safely reach a safe landing location in case of a detected abnormal condition associated with battery pack 22 along the route of aircraft 10.

In some embodiments, EPU 26 may include one or more rocket engines 28 (e.g., gas generator(s)) (referred hereinafter in the singular) for generating a stream of exhaust fluid (e.g., combustion gas) using one or more rocket propellants, one or more turbines 30 (referred hereinafter in the singular) operatively connected to extract energy from the stream of exhaust fluid generated by rocket engine 28, and one or more electric generators 32 (referred hereinafter in the singular) operatively connected to be driven by turbine 30 and to supply emergency electric power to motor 20.

In contrast with conventional gas turbine engines, EPU 26 may be devoid of a compressor. For example, EPU 26 may make use of a rocket thermodynamic cycle as opposed to a Brayton thermodynamic cycle. The rocket thermodynamic cycle may use pre-compressed/liquefied oxidizer instead of having to carry a compressor which would consume some of the output power of turbine 30 as a Brayton thermodynamic cycle would. In other words, substantially all of the output power from turbine 30 may be used to drive electric generator 32. In addition, the use of a liquefied oxidizer may allow the oxidizer to be compressed at a higher pressure ratio than air and using less energy than required for pressurizing air at the same pressure ratio. In other words, the use of rocket engine 28 in EPU 26 as opposed to a conventional gas turbine engine may, in some embodiments, provide a relatively high power density for EPU 26 and a relatively high extraction efficiency. This in turn may promote a relatively low weight and size of EPU 26.

Rocket engine 28 of EPU 26 may include reaction (e.g., combustion) chamber 34 inside of which a fuel and an oxidizer may be combined to react together and generate the stream of exhaust fluid out of rocket engine 28. Rocket engine 28 may be configured to use any suitable rocket propellant(s). In some embodiments, the fuel and the oxidizer may be selected to be marginally hypergolic in order to spontaneously combust upon mixing. The use of hypergolic propellants may reduce or eliminate the need for an igniter to sustain combustion in reaction chamber 34. Depending on the selection of propellant(s), suitable means of initiating the reaction/combustion may be required. In some embodiments, liquid rocket propellants may be used with rocket engine 28. In some embodiment, the fuel may be kerosene and the oxidizer may be nitric acid ($HNO_3$).

The fuel may be stored in fuel tank 36 and the oxidizer may be stored in oxidizer tank 38. In embodiments where the fuel is kerosene, the fuel tank 36 may be made of an aluminum alloy or other suitable material. In embodiments where the oxidizer is nitric acid, the oxidizer tank 38 may be made of steel or other suitable material. The amounts of fuel and oxidizer, and the size of the corresponding fuel tank 36 and oxidizer tank 38 may be selected based on the power-generating capacity of EPU 26 determined to be adequate for aircraft 10.

In some embodiments, EPU 26 may include water tank 40 containing water that may be used to cool turbine 30 during operation of EPU 26 as explained further below. Water from water tank 40 may be supplied to turbine 30 using water pump 41. In some embodiments, water tank 40 may be separate from fuel tank 36 and oxidizer tank 38 where fuel tank 36 and oxidizer tank 38 are disposed outside of water tank 40. In some embodiments, fuel tank 36, oxidizer tank 38 and water tank 40 may be integrated together to define a replaceable cartridge (i.e., line-replaceable unit) containing the consumables of EPU 26, and that may be replaced relatively easily after using EPU 26. For example, the replacement of such cartridge may permit the reuse of some or all of the components of EPU 26 multiple times.

Such replaceable cartridge may include suitable fluid transfer connections to facilitate the installation of the cartridge within EPU 26 and to permit the discharge of fuel, oxidizer and water from their respective tanks 36, 38, 41 in the cartridge. In some embodiments, fuel tank 36 and oxidizer tank 38 may be disposed inside of water tank 40. In some embodiments, fuel tank 36, oxidizer tank 38 and water tank 40 may be attached together to define the replaceable cartridge.

Upon the detection of the abnormal condition associated with battery pack 22, EPU 26 may be activated by releasing fuel from fuel tank 36 and releasing oxidizer from oxidizer tank 38 and mixing the fuel and oxidizer inside of reaction chamber 34 to activate rocket engine 28 and start expelling exhaust fluid from rocket engine 28. Fuel may be delivered to reaction chamber 34 via fuel pump 42 and/or a valve, and oxidizer may be delivered to reaction chamber 34 via oxidizer pump 44 and/or a valve. The reaction (e.g., combustion) of the fuel with the oxidizer may generate a stream of fluid (e.g., combustion gas) that may be expelled from rocket engine 28 and directed into turbine 30. Turbine 30 may extract energy from the stream of exhaust fluid and convert that energy into motive energy for driving electric generator 32. In various embodiments, turbine 30 may be an axial flow turbine or a radial flow turbine. The electric power generated by electric generator 32 may then be used to drive motor 20 and permit aircraft 10 to be propelled to a safe landing location. In some embodiments, suitable power electronics may be used to condition the electric power and/or control the delivery of electric power from electric generator 32 to motor 20.

FIG. 3A is a schematic axial cross-sectional view of part of an exemplary configuration of EPU 26 of power plant 12 taken in a plane parallel to and containing rotation axis RA. FIG. 3B is an enlarged schematic axial cross-sectional view of part of EPU 26 of FIG. 3A.

FIG. 3A shows only an upper portion of EPU 26 above rotation axis RA and the complete axial cross-section of EPU 26 may include a counterpart (e.g., mirror image) of that shown in FIG. 3A below rotation axis RA. Rocket engine 28, turbine 30 and electric generator 32 may be integrated in a configuration that promotes an efficient use of space, operational efficiency and/or low weight. In some embodiments, turbine 30 may be configured as a Ljungström double rotation turbine so that rocket engine 28 may be disposed centrally of turbine 30. Turbine 30 may be a radial flow turbine including counter-rotating first turbine disc 46A and second turbine disc 46B. First turbine disc 46A and second turbine disc 46B may be configured to rotate coaxially and in opposite directions about rotation axis RA when driven by the flow of exhaust fluid discharged from reaction chamber 34 and flowing radially outwardly from reaction chamber 34.

First turbine disc 46A and second turbine disc 46B may define a radially extending fluid (e.g., gas) path 47 for conveying the exhaust fluid being discharged from reaction chamber 34. First turbine disc 46A and second turbine disc 46B may include respective circumferential rows of axially-extending blades 48A, 48B disposed in fluid path 47 for interacting with the flow of exhaust fluid. The rows of axially-extending blades 48A, 48B from respective first turbine disc 46A and second turbine disc 46B may be radially interleaved so that the exhaust fluid may interact with axially-extending blades 48A, 48B from first turbine disc 46A and from second turbine disc 46B in an alternating manner as the exhaust fluid flows radially outwardly from rotation axis RA. In other words, first turbine disc 46A may include one or more circular arrays of axially-extending blades 48A, and second turbine disc 46B may include one or more circular arrays of axially-extending blades 48B. The circular arrays of axially-extending blades 48A may be interleaved with the circular arrays of axially-extending blades 48B.

Axially-extending blades 48A, 48B may be configured and disposed to induce rotation of first turbine disc 46A and second turbine disc 46B in opposite directions. The radially (i.e., streamwise) alternating arrangement of axially-extending blades 48A, 48B may reduce or eliminate the need for stators disposed in fluid path 47 for re-orienting the flow of exhaust fluid in part(s) of turbine 30.

In some embodiments, first turbine disc 46A may include one or more rows of radially-extending blades 50A, and second turbine disc 46B may include one or more rows of radially-extending blades 50B. In some embodiments, fluid path 47 may be split into two branches where a first branch receives a first portion of the exhaust fluid for interacting with radially-extending blades 50A of first turbine disc 46A, and a second branch receives a second portion of the exhaust fluid for interacting with radially-extending blades 50B of second turbine disc 46B. Radially-extending blades 50A, 50B may cooperate with axially-extending blades 48A, 48B to induce rotation of their respective turbine discs 46A, 46B.

In some embodiments, each row of axially-extending blades 48A, 48B may be configured to handle a 1.8 to 2 expansion ratio. In embodiments where the oxidizer and fuel may generate exhaust fluid at a pressure of about 63 bar resulting in an overall expansion ration of about 63:1. Such expansion ratio may require about 6 rows of axially-extending blades 48A, 48B based on the relationship $2^{\wedge}(N \text{ rows})=63$ resulting in N=6 as shown in FIG. 3A. In some embodiments, a last turbine stage including radially-extending blades 50A, 50B may optionally be provided to add to the energy extraction efficiency of turbine 30. In some embodiments, one or more stators may be used to cause the exhaust fluid to turn from the radial direction toward the radially-extending blades 50A, 50B.

After expanding along fluid path 47 and interacting with radially-extending blades 50A, 50B, the exhaust fluid may be exhausted to the environment. In some embodiments, the exhaust fluid may be directed to volute 51 (e.g., scroll) including one or two lobes prior to exiting EPU 26 to reduce the back pressure on turbine 30.

First turbine disc 46A and second turbine disc 46B may have cooperating geometries and generally similar constructions. First turbine disc 46A may include base 52A and liner 54A. Similarly, second turbine disc 46B may include base 52B and liner 54B. Bases 52A, 52B may each be made of a metallic material such as a suitable nickel-based alloy for example. In some embodiments, bases 52A, 52B may include respective radially-extending blades 50A, 50B. Liners 54A, 54B may define at least part of fluid path 47 and may be exposed to relatively hot exhaust fluid that is discharged from reaction chamber 34. Liners 54A, 54B may include respective axially-extending blades 48A, 48B. Liners 54A, 54B may be made from a material having a higher resistance to elevated temperature environments than the material of bases 52A, 52B. For example, liners 54A, 54B may be made from a material containing graphite (e.g., a graphite structure). In some embodiments, liners 54A, 54B may be made from a pyrolytic graphite. In some embodiments, liners 54A, 54B may have an anisotropic internal structure with respect to electric and thermal conductivity. For example, the graphite structure of liners 54A, 54B may permit liners 54A, 54B to have a higher thermal conductivity in the radial direction and a lower thermal conductivity in the axial/thickness direction. For example, in some embodiments, liners 54A, 54B may have a thermal conductivity of 1200 to 1700 W/m/K (watts per meter-kelvin) radially and 0.6 W/m/k axially relative to rotation axis RA. This arrangement may promote more heat dissipation in the radial direction compared to the axial direction.

Liners 54A, 54B may be secured (e.g., bonded, fastened) to respective bases 52A, 52B using any suitable means. In some embodiments, one or more linear and/or non-linear (e.g., wavy) contact interfaces may be disposed between liners 54A, 54B and respective bases 52A, 52B. In some embodiments, such contact interfaces may provide shape interlocking so that the orientation(s) of the contact interface(s) oppose the axial force(s) and/or the centrifugal/radial force(s) experienced by first turbine disc 46A and second turbine disc 46B. In other words, the contact face angles between the metallic bases 52A, 52B and the graphite liners 54A, 54B may be chosen so that the normal(s) to the face surface(s) align with the resultant of centrifugal and/or pressure forces.

First turbine disc 46A and second turbine disc 46B may each include a through central bore extending along rotation axis RA. Reaction chamber 34 may be disposed centrally of first turbine disc 46A and of second turbine disc 46B. Reaction chamber 34 may occupy the central bores of first turbine disc 46A and of second turbine disc 46B. Reaction chamber 34 may be defined by first perforated plate 56A and second perforated plate 56B axially spaced apart from first perforated plate 56A along rotation axis RA. First perforated plate 56A may provide fluid communication for the oxidizer from oxidizer tank 38 (shown in FIG. 2) to enter reaction chamber 34. Second perforated plate 56B may provide fluid communication for the fuel from fuel tank 36 (shown in FIG. 2) to enter reaction chamber 34.

During operation of turbine 30, perforated plates 56A, 56B may rotate with respective turbine discs 46A, 46B and may promote the distribution and mixing of the fuel with the oxidizer inside of reaction chamber 34. Accordingly, the walls defining reaction chamber 34 may rotate during operation. For example, part of reaction chamber 34 may rotate in one direction with first turbine disc 46A, and another part of reaction chamber 34 may rotate in the opposite direction with second turbine disc 46B. Perforated plates 56A, 56B may be made from any material suitable for the environmental conditions inside of reaction chamber 34. In some embodiments, perforated plates 56A, 56B may be made from or may include pyrolytic graphite.

Rocket engine 28 may include stationary (i.e., non-rotating) generally cylindrical plugs 58A, 58B where first plug 58A is disposed to one axial side of reaction chamber 34 and second plug 58B is disposed to the other axial side of reaction chamber 34. First (e.g., carbon contact) seal 60A may be disposed between first plug 58A and base 52A of first turbine disc 46A. Similarly, second (e.g., carbon contact) seal 60B may be disposed between second plug 58B and base 52B of second turbine disc 46B.

During operation of rocket engine 28, the oxidizer may be received inside of first plug 58A via oxidizer pump 44 and may be directed outside of first plug 58A via one or more orifices providing fluid communication between the interior of first plug 58A and a radially-outer side of first plug 58A. The one or more orifices may extend radially through a wall of first plug 58A. The radially-outer side of first plug 58A may define one or more helical first grooves 62A (e.g., base relief) (referred hereinafter in the singular) leading the oxidizer received from the interior of first plug 58A axially toward first perforated plate 56A and reaction chamber 34. In various embodiments, first groove 62A may have a depth of between 0.001" to 0.032" (0.025 mm to 0.813 mm).

The radial clearance between first plug 58A and the rotating base 52A of first turbine disc 46A may be relatively small. The rotation of base 52A relative to first plug 58A may define an axial/helical pump whereby the rotation of base 52A may entrain the oxidizer to flow along first groove 62A and drive the oxidizer toward reaction chamber 34. The helical pump defined by first plug 58A and base 52A of first turbine disc 46A may function as a (e.g., positive displacement) pump that varies the flow rate of oxidizer to reaction chamber 34 as a function of the operating speed of turbine 30. The helical pump defined by first plug 58A and base 52A of first turbine disc 46A may also serve as a high-pressure stage seal directing the oxidizer away from seal 60A and thereby unloading seal 60A. In some embodiments, first groove 62A may be disposed on a radially-inner surface of base 52A of first turbine disc 46A instead of on the radially-outer surface of first plug 58A.

Fuel may be received inside of second plug 58B via fuel pump 42 and may be directed outside of second plug 58B via one or more orifices providing fluid communication between the interior of second plug 58B and a radially-outer side of second plug 58B. The one or more orifices may extend radially through a wall of second plug 58B. The radially-outer side of second plug 58B may define one or more helical second grooves 62B (e.g., base relief) (referred hereinafter in the singular) leading the fuel received from the interior of second plug 58B axially toward second perforated plate 56B and reaction chamber 34. In various embodiments, second groove 62B may have a depth of between 0.001" to 0.032" (0.025 mm to 0.813 mm).

The radial clearance between second plug 58B and the rotating base 52B of second turbine disc 46B may be relatively small. The rotation of base 52B relative to second plug 58B may define an helical pump whereby the rotation of base 52B may entrain the fuel to flow along second groove 62B and drive the fuel toward reaction chamber 34. The helical pump defined by second plug 58B and base 52B of second turbine disc 46B may function as a (e.g., positive displacement) pump that provides a substantially constant flow at fixed speed, and that varies the flow rate of fuel to reaction chamber 34 as a function of the operating speed of turbine 30. The helical pump defined by second plug 58B and base 52B of second turbine disc 46B may also serve as a high-pressure stage seal directing the fuel away from seal 60B and thereby unloading seal 60B. In some embodiments, second groove 62B may be disposed on a radially-inner surface of base 52B of second turbine disc 46B instead of on the radially-outer surface of second plug 58B.

The size and configuration of first groove 62A and second groove 62B may be selected to supply oxidizer and fuel to reaction chamber 34 according to a desired proportion. In some embodiments, such proportion may be selected to obtain a stoichiometric reaction inside of reaction chamber 34. In some embodiments, such proportion may be selected to obtain a reaction inside of reaction chamber 34 that is richer (i.e., fuel rich) than stoichiometric. In some situations a reaction that is slightly fuel rich may reduce the risk of oxidation of the graphite components that may interact with the exhaust fluid (e.g., combustion gas) resulting from the reaction. In some situations, the graphite components may resist temperatures of up to about 3000° C. without significant mechanical properties loss in the absence of oxygen.

In some embodiments of turbine 30, first turbine disk 46A and second turbine disc 46B may be fluid-cooled during operation using water supplied from water tank 40 (shown in FIG. 2) using water pump 41. First turbine disc 46A and second turbine disc 46B may each include a respective internal cooling passage 64A, 64B for cooling. Cooling passages 64A, 64B may be defined in metallic base 52A of first turbine disc 46A and in metallic base 52B of second turbine disc 46B. During operation of turbine 30, water in liquid form may be received in cooling passages 64A, 64B via respective water inlets 66A, 66B. The water may then be discharged from cooling passages 64A, 64B in gas (steam) form via respective water outlets 68A, 68B. In some embodiments, water outlets 68A, 68B may be disposed downstream of or along fluid path 47 defined by turbine 30. For example, water outlets 68A, 68B may be disposed at a location along fluid path 47 downstream of axially-extending blades 48A, 48B and upstream of radially-extending blades 50A, 50B. The steam discharged from cooling passages 64A, 64B at such location may be mixed with the exhaust fluid conveyed in fluid path 47. At such location, some of the energy in the steam may be recovered by radially-extending blades 50A, 50B disposed downstream of water outlets 68A, 68B.

The use of water flowing through cooling passages 64A, 64B may provide an open loop cooling scheme where the water is consumed. In embodiments of EPU 26 with longer duty cycle times (e.g., 20 or more minutes), closed loop cooling using water or other cooling fluid may be employed instead of open loop cooling.

First turbine disc 46A and second turbine disc 46B may be constructed using tubular double wall shafts that support metallic discs containing cooling passages 64A, 64B respectively. Water may be continuously pumped in cooling passages 64A, 64B extending between the double wall shafts, progress into the discs and then be released on the axial faces of first and second turbine discs 46A, 46B including respective graphite liners 54A, 54B.

Cooling of bases 52A, 52B of first and second turbine discs 46A, 46B may result in metallic bases 52A, 52B being cooler than their respective graphite liners 54A, 54B. In some embodiments, a temperature of bases 52A, 52B may be maintained at about half of the temperature of the respective graphite liners 54A, 54B without creating excessive thermal mismatch between metallic bases 52A, 52B and the respective graphite liners 54A, 54B. The amount of cooling required may be selected based on the materials used in the construction of turbine 30, the fuel and oxidizer used, and the expected operating conditions. In various embodiments, water cooling may be used to extract heat from components of turbine 30 and/or water may be supplied to reaction chamber 34 by being added to and mixed with the oxidizer and/or with the fuel during operation of EPU 26 to reduce the temperature of the exhaust fluid being discharged from reaction chamber 34.

In some embodiments, generator 32 of EPU 26 may be segmented to include two generators 32A, 32B that may be driven by turbine 30 and that may supply electric power to motor 20 (shown in FIG. 2). In some embodiments, first generator 32A may be operatively connected to be driven by first turbine disc 46A, and second generator 32B may be operatively connected to be driven by second turbine disc 46B.

First generator 32A may include first stator 70A and first rotor 72A. First rotor 72A may be secured to first turbine disc 46A for common rotation with first turbine disc 46A. In some embodiments, first turbine disc 46A may rotate at a rate of 20,000 to 65,000 revolutions per minute (RPM) and no speed-changing gearbox may be required between first turbine disc 46A and first rotor 72A. First rotor 72A may rotate about rotation axis RA and may be coaxial with first turbine disc 46A. First stator 70A may be stationary and may be secured to a housing of EPU 26 for example. First rotor 72A and/or first turbine disc 46A may be rotatably supported by first stator 70A or by other stationary structure via one or more first bearings 74A.

First generator 32A may be of any suitable type. In some embodiments, first generator 32A may have a "pancake" configuration, also known as a "printed armature" configuration relying on a flat construction principle with an axial air gap and magnetic flux, with current that runs radially from the center of the generator to its periphery and back. In other embodiments, first generator 32A may be a permanent magnet electric machine, or may be a switched reluctance electric machine. As illustrated in FIG. 3A, first generator 32A may have a multiple pancake configuration including current collector 76A via which current may be delivered from first generator 32A. This configuration of first generator 32A may also be referred to as a coreless rotor current collector electric machine. Energy losses within first generator 32A may be mainly due to the electric resistance of the rotor windings. The lack of core in first generator 32A may reduce or eliminate magnetic hysteresis losses that may be present in other types of electric generators. The magnetic field in first stator 70A may be fixed and consequently there may be no significant energy losses in first stator 70A. The rotor windings may include a plurality of petal-like singular windings connected at each end to suitable electric busses each connected to current collector 76A which may have the form of a ring.

First stator 70A may include a ferromagnetic yoke routing the magnetic field from a magnet to the face of the rotor discs. The ferromagnetic yoke may be made from Metglas having a magnetic permeability of up to 10 times that of soft iron. First stator 70A may have a comb-like geometry in axial-helical cross section. Comb fingers of first stator 70A may extend between the rotor discs and be interleaved with rotor discs. In a transverse cross section in a plane perpendicular to rotation axis RA, first stator 70A may have a plurality of evenly distributed sectors of alternative magnetic polarity, i.e., connected to one face or to the opposite face of the driving permanent magnet. The magnetic sectors may be imbedded in pyrolytic graphite which may allow a reduced (e.g., 4 times less) spacing than air due to the paramagnetic properties of pyrolytic graphite. Accordingly, the thin rotor discs may ride on an air bearing formed between the rotor discs and stator 70A. The air bearing may counteract the forces developed in the rotor discs due to the induced current. Such forces may tend to deform each rotor disc in a wavy pattern, which acts as a hydrodynamic wedge causing the air hydrodynamic pressure to increase with the amplitude of the wavy pattern.

First generator 32A may operate as a relatively high frequency AC generator. The AC current generated by first generator 32A may be rectified and filtered into DC current that may then be delivered to motor 20 using an inverter for example.

First turbine disc 46A may be axially and rotatably supported by first stator 70A or other stationary structure via a suitable first thrust bearing 78A. In some embodiments, first thrust bearing 78A may be a fluid bearing where the axial thrust is supported by a relatively thin layer of pressurized fluid. In some embodiments, the pressurized fluid may include steam supplied from first cooling passage 64A via port 80A providing fluid communication between first thrust bearing 78A and first cooling passage 64A.

In various embodiments, second generator 32B may have a different or similar construction as first generator 32A described above. As illustrated in FIG. 3A, second generator 32B may have a multiple pancake configuration substantially identical to first generator 32A including current collector 76B via which current may be delivered from second generator 32B. Second generator 32B may include second stator 70B and second rotor 72B. Second rotor 72B may be secured to second turbine disc 46B for common rotation with second turbine disc 46B. Second rotor 72B may rotate about rotation axis RA and may be coaxial with second turbine disc 46B. Second stator 70B may be stationary and may be secured to a housing of EPU 26 for example. Second rotor 72B and/or second turbine disc 46B may be rotatably supported by second stator 70B or by other stationary structure via one or more second bearings 74B.

Second turbine disc 46B may be axially and rotatably supported by second stator 70B or other stationary structure via a suitable second thrust bearing 78B. In some embodiments, second thrust bearing 78B may be a fluid bearing where the axial thrust is supported by a relatively thin layer of pressurized fluid. In some embodiments, the pressurized fluid may include steam supplied from second cooling passage 64B via port 80B providing fluid communication between second thrust bearing 78B and second cooling passage 64B.

Figure 4:
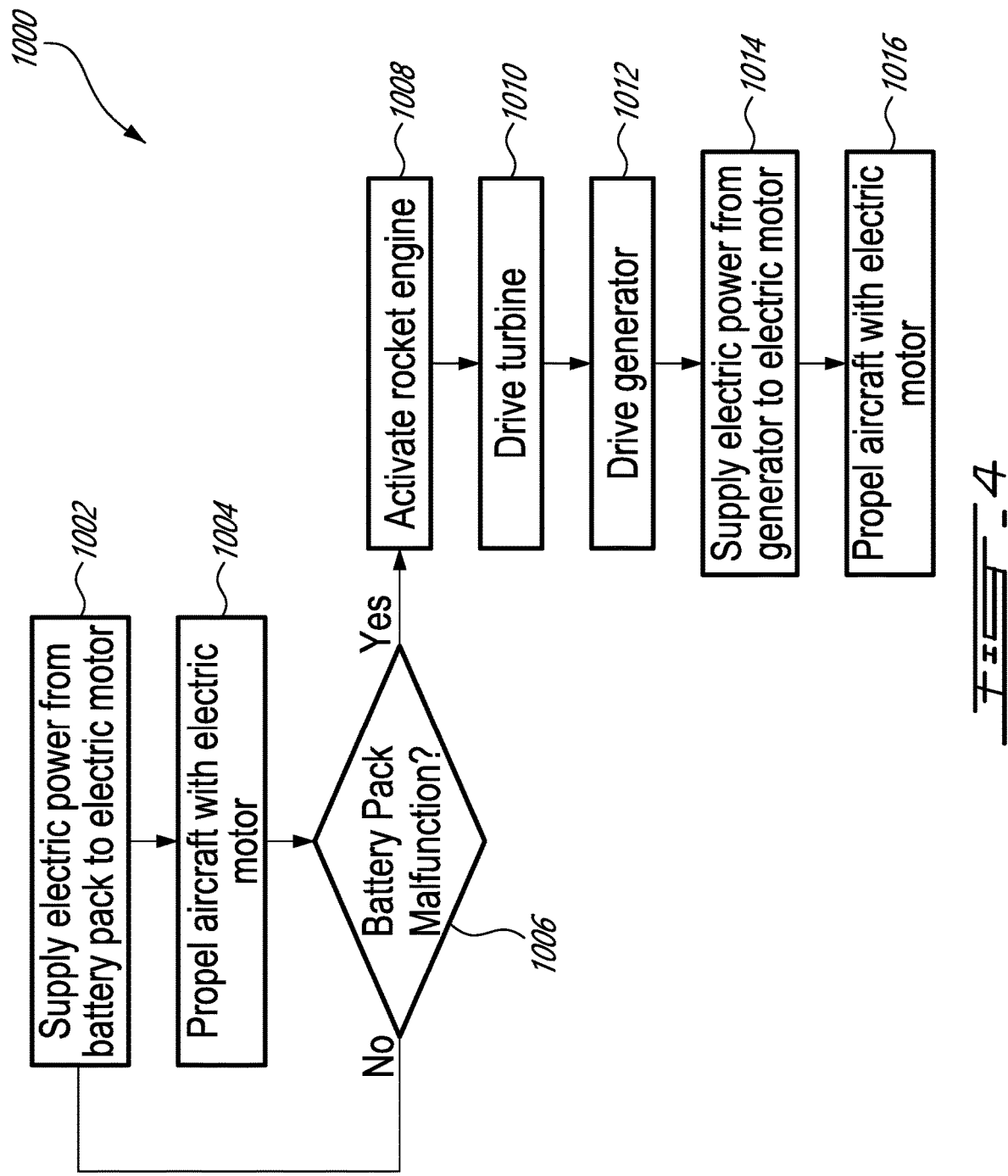
FIG. 4 is a flow diagram of a method of operating an electric aircraft during an abnormal condition associated with an electric power source of the electric aircraft.

FIG. 4 is a flow diagram of a method 1000 of operating aircraft 10 during an abnormal condition (e.g., malfunction) of an electric power source (e.g., battery pack 22) of aircraft 10. Method 1000 may be performed using power plant 12 described herein or using other power plant(s). Aspects of method 1000 may be combined with aspects of other methods or actions described herein. Aspects of power plant 12 may also be incorporated into method 1000. In various embodiments, method 100 may include:

supplying first electric power from a source of electric power (e.g., battery pack 22) to electric motor 20 propelling aircraft 10 (blocks 1002 and 1004);

detecting an abnormal condition associated with the source of electric power (block 1006);
after detecting the abnormal condition:
activating rocket engine 28 to generate a stream of exhaust fluid from rocket engine 28 (block 1008);
driving turbine 30 using the exhaust fluid (block 1010);
driving electric generator 32 with turbine 30 to generate second electric power (block 1012); and
using the second electric power to drive electric motor 20 propelling aircraft 10 (blocks 1014 and 1016).

Various actions described herein in relation to EPU 26 may be incorporated into method 1000. For example, water may be directed inside a body (e.g., bases 52A, 52B of first and second turbine discs 46A, 46B) of turbine 30 to cool turbine 30. Such water cooling may be implemented in an open loop scheme where the water may be discharged from the body of the turbine as steam into the exhaust fluid and mixed with the exhaust fluid.

The embodiments described in this document provide non-limiting examples of possible implementations of the present technology. Upon review of the present disclosure, a person of ordinary skill in the art will recognize that changes may be made to the embodiments described herein without departing from the scope of the present technology. further modifications could be implemented by a person of ordinary skill in the art in view of the present disclosure, which modifications would be within the scope of the present technology.

What is claimed is:

1. An electric aircraft power plant comprising:
an electric motor for propelling an electric aircraft;
a source of electric power operatively connected to drive the electric motor;
a first tank storing a first propellant;
a second tank storing a second propellant;
a gas generator operatively connectable to the first and second tanks to receive the first and second propellants, and generate a stream of exhaust gas from a reaction of the first and second propellants;
a turbine operatively connected to the gas generator to extract energy from the stream of exhaust gas generated by the gas generator; and
an electric generator operatively connected to be driven by the turbine and to supply electric power to the electric motor;
wherein:
the turbine is a radial turbine;
the turbine includes counter-rotating first and second turbine discs rotatable about an axis;
the first and second turbine discs each include a central bore extending along the axis; and
a reaction chamber of the gas generator occupies the central bores of the first and second turbine discs.

2. The electric aircraft power plant as defined in claim 1, wherein the turbine is configured as a Ljungström turbine.

3. The electric aircraft power plant as defined in claim 1, wherein:
the electric generator is a first electric generator operatively connected to be driven by the first turbine disc; and
the electric aircraft power plant includes a second electric generator operatively connected to be driven by the second turbine disc.

4. The electric aircraft power plant as defined in claim 3, wherein:
the first and second turbine discs are coaxial;
the first electric generator is coaxial with the first turbine disc; and
the second electric generator is coaxial with the second turbine disc.

5. The electric aircraft power plant as defined in claim 3, wherein the first turbine disc includes an internal cooling passage for cooling the first turbine disc.

6. The electric aircraft power plant as defined in claim 5, wherein the internal cooling passage includes a port providing fluid communication between the internal cooling passage and a thrust bearing axially supporting the first turbine disc.

7. The electric aircraft power plant as defined in claim 5, wherein:
the turbine defines a gas path for conveying the stream of exhaust gas generated by the gas generator;
the first turbine disc includes an axially-extending blade and a radially-extending blade disposed in the gas path; and
the internal cooling passage includes an outlet providing fluid communication between the internal cooling passage and the gas path at a location downstream of the axially-extending blade and upstream of the radially-extending blade.

8. The electric aircraft power plant as defined in claim 4, wherein:
the first turbine disc includes a base made of a metallic material and a plurality of blades supported by the base; and
the plurality of blades are made of a material containing pyrolytic graphite.

9. The electric aircraft power plant as defined in claim 1, wherein:
the reaction chamber is defined by a first perforated plate, and a second perforated plate axially spaced apart from the first perforated plate along the axis;
the first perforated plate provides fluid communication between the first tank and the reaction chamber; and
the second perforated plate provides fluid communication between the second tank and the reaction chamber.

10. The electric aircraft power plant as defined in claim 9, wherein:
the first perforated plate is mounted for common rotation with the first turbine disc; and
the second perforated plate is mounted for common rotation with the second turbine disc.

11. An electric vertical take-off and landing aircraft comprising the electric aircraft power plant as defined in claim 1.

12. An emergency power unit for an electrically-propelled aircraft, the emergency power unit comprising:
a rocket engine for generating a stream of exhaust fluid using a rocket propellant;
a turbine operatively connected to extract energy from the stream of exhaust fluid generated by the rocket engine; and
an electric generator operatively connected to be driven by the turbine and to supply electric power to an electric motor for propelling the electrically-propelled aircraft;
wherein:
the rocket propellant is a first rocket propellant;
the emergency power unit includes a first tank storing the first rocket propellant;

the emergency power unit includes a second tank storing a second rocket propellant; and the first and second tanks are disposed inside a water tank.

13. The emergency power unit as defined in claim 12, wherein:

the turbine is a radial turbine;

the turbine includes counter-rotating first and second turbine discs;

the electric generator is a first electric generator operatively connected to be driven by the first turbine disc; and the emergency power unit includes a second electric generator operatively connected to be driven by the second turbine disc and to supply electric power to the electric motor.

14. The emergency power unit as defined in claim 12, wherein:

the turbine includes a turbine disc having a base and a liner secured to the base;

the base is made from a metallic material;

the liner defines a plurality of blades for interacting with the exhaust fluid; and the liner is made of a material containing pyrolytic graphite.

15. The emergency power unit as defined in claim 14, wherein the base includes an internal cooling passage fluidly connectable to receive water from the water tank.

16. A method of operating an electrically-propelled aircraft, the method comprising:

supplying first electric power from a source of electric power to an electric motor propelling the aircraft;

detecting an abnormal condition associated with the source of electric power;

after detecting the abnormal condition:

activating a rocket engine using a first rocket propellant and a second rocket propellant to generate a stream of exhaust fluid from the rocket engine, the first rocket propellant being stored in a first tank and the second rocket propellant being stored in a second tank, the first and second tanks being disposed inside a water tank;

driving a turbine using the exhaust fluid;

cooling the turbine with water from the water tank;

driving an electric generator with the turbine to generate second electric power; and using the second electric power to drive the electric motor propelling the aircraft.

\* \* \* \* \*